United States Patent [19]

Bosik et al.

[11] 4,239,935
[45] Dec. 16, 1980

[54] RINGING GENERATOR

[75] Inventors: Barry S. Bosik, Parsippany; Frank P. Tuhy, Jr., Montville, both of NJ

[73] Assignee: Bell Telephone Laboratories, Incorporated, Murray Hill, N.J.

[21] Appl. No.: 34,200

[22] Filed: Apr. 27, 1979

[51] Int. Cl.³ .............................................. H04M 1/66
[52] U.S. Cl. ............................... 179/84 R; 179/84 A; 179/2.51
[58] Field of Search ............... 307/261, 263, 267, 268, 307/108; 325/323, 324; 328/34, 58, 114; 179/84 R, 84 A, 2.5 R, 16 EA

[56] References Cited

U.S. PATENT DOCUMENTS

| | | | |
|---|---|---|---|
| 3,244,958 | 4/1966 | Peterson | 307/228 |
| 3,252,045 | 5/1966 | Griffin | 307/228 |
| 3,444,394 | 5/1969 | Colvson | 307/268 |
| 3,548,219 | 12/1970 | Lawrie, Jr. et al. | 307/268 |
| 3,772,533 | 11/1973 | Bruckner et al. | 307/261 |
| 3,868,519 | 2/1975 | Green | 307/270 |
| 3,991,325 | 11/1976 | Hilbourne et al. | 307/261 |
| 4,015,091 | 3/1977 | Rao et al. | 179/84 R |
| 4,025,729 | 5/1977 | Stone | 179/84 R |
| 4,056,693 | 11/1977 | Bosik et al. | 179/84 R |

Primary Examiner—Gerald L. Brigance
Attorney, Agent, or Firm—Robert O. Nimtz

[57] ABSTRACT

A ringing signal generator is disclosed for remotely generating telephone ringing signals having a trapezoidal waveform. A single capacitor and two constant current sources control the wave shape while current limiting is provided on both the positive going and negative going half-cycles of the ringing signal. A voltage offset is provided between the ringing signal source and the subscriber line to prevent loading the ringing signal with the subscriber line feed circuit.

10 Claims, 1 Drawing Figure

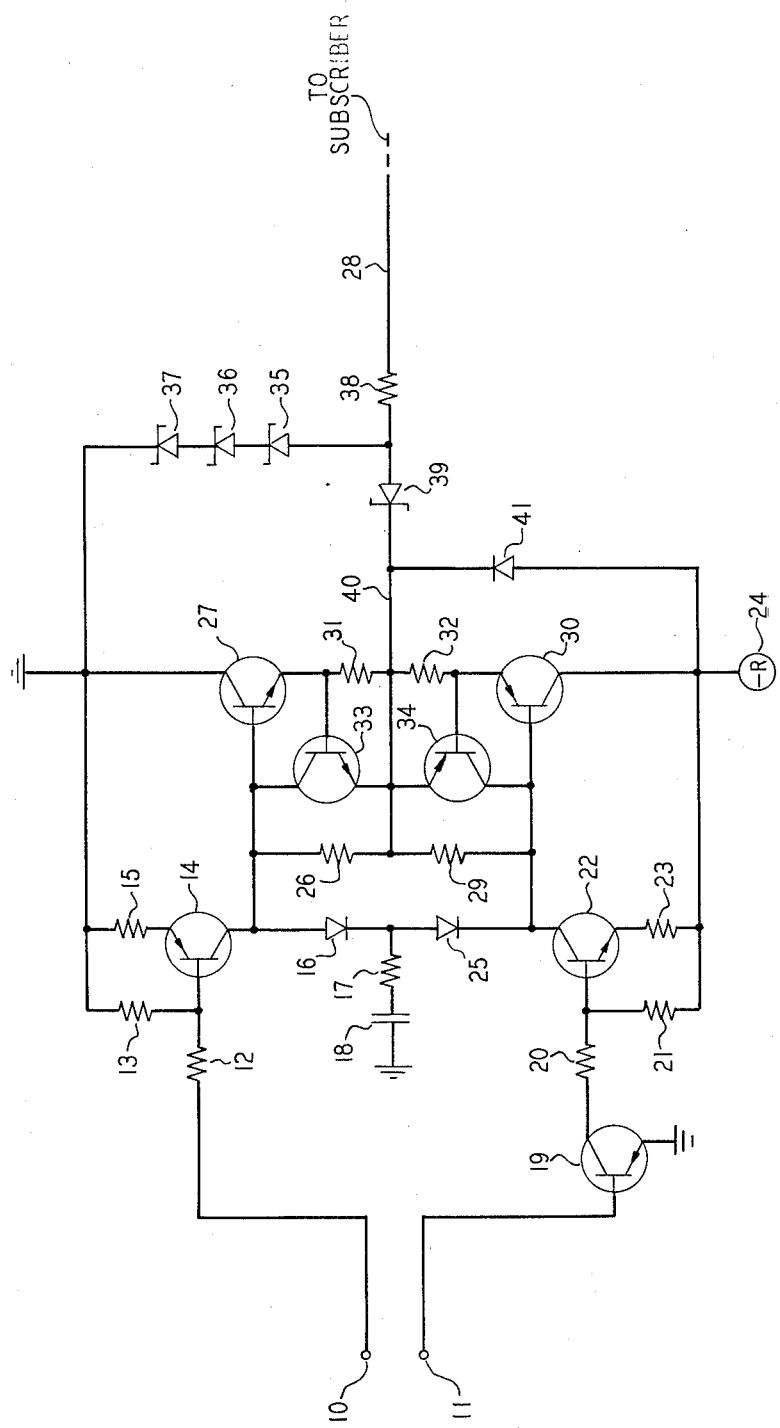

RINGING GENERATOR

BACKGROUND OF THE INVENTION

1. Field of the Invention

This invention relates to ringing signal generators for telephone systems and, more particularly, to the remote generation of ringing signals for subscriber loop pair gain systems.

2. Description of the Prior Art

It has become increasingly common to utilize carrier techniques to establish communication paths between a telephone central office and a plurality of remotely located telephone subscribers. Where such systems were at one time economically justifiable only for extremely long rural routes, today, due to the rapidly decreasing costs of integrated microelectronics, such systems are becoming economically feasible for shorter and shorter subscriber loops.

In a subscriber loop carrier system, a plurality of voice channels are derived on one or two pairs of wire conductors by using analog carrier frequency division techniques or by using time division digital techniques. In either case, the metallic connection previously used for transmitting subscriber ringing signals to the subscriber location can no longer be used for this purpose. It has therefore become necessary to generate ringing signals at the remote terminal of the carrier system and to control the generation and application of these ringing signals by supervisory information transmitted over the carrier-derived channels.

Since remote ringing signal generators serve a relatively small number of subscribers, must be housed at the remote location and are preferably powered from the central office, it is desirable that such ringing signal generators be small, inexpensive, compact and require little power. One such system is shown in the copending application of B. S. Bosik, Ser. No. 974,384, filed Dec. 29, 1978.

One convenient way to generate ringing signals at the remote location is that shown in the above-mentioned Bosik application. A direct current voltage of high magnitude is generated from the central office battery voltage using dc-to-dc conversion techniques. Semiconductor switches can then be used to interrupt this direct current voltage at a ringing signal rate. The resulting pulses of voltage are applied to the subscriber drop wires to operate the mechanical ringer in the subscriber's telephone set. Unfortunately, the high voltage square waves generated in this way include many high frequency harmonics which induce audible frequency voltages in adjacent wire pairs. These induced voltages (crosstalk) interfere with the use of such adjacent pairs by other telephone subscribers.

SUMMARY OF THE INVENTION

In accordance with the illustrative embodiment of the present invention, a remote ringing signal generator for a subscriber loop carrier system generates trapezoidal-shaped ringing signals. Such trapezoidal-shaped signals have significantly lower amplitude high frequency harmonics than square waves. Trapezoidal waves therefore inherently cause much lower levels of crosstalk interference than do square waves.

In accordance with one feature of the present invention, such trapezoidal-shaped waves are generated at low power levels using a single capacitor alternately charged and discharged by low voltage constant current sources. The voltage on this capacitor is then used to control high voltage, high current transistors which apply ringing voltage of the desired shape to the subscriber's line. Simple circuit arrangements for level shifting and current limiting are also possible in this configuration.

BRIEF DESCRIPTION OF THE DRAWING

In the drawing there is shown a detailed circuit diagram of a trapezoidal ringing signal generator in accordance with the present invention.

DETAILED DESCRIPTION

In the drawing there is shown a ringing signal generator comprising a pair of input terminals 10 and 11 to which a 20 Hz double-railed square wave control signal is applied. This is, the signals on terminals 10 and 11 are in synchronism, but when the signal at terminal 10 is in a high state, the signal at terminal 11 is in a low state, and vice versa. Alternations between these states occur at a 20 Hz rate. Circuits for generating such 20 Hz control signals are disclosed in the above-mentioned copending application of B. S. Bosik.

Input signals at input terminal 10 are applied across a voltage divider comprising resistors 12 and 13, the midpoint of which is connected to the base of pnp transistor 14. The emitter of transistor 14 is connected through resistor 15 to ground potential. When enabled by a negative signal at input terminal 10, transistor 14 operates as a constant current source to deliver a constant charging current through diode 16 and resistor 17 to capacitor 18.

Signals at input terminal 11 are delivered to the base of pnp transistor 19 which, when enabled by a negative signal at input terminal 11, draws a current through the voltage divider comprising resistors 20 and 21. The midpoint of resistors 20 and 21 is connected to the base of npn transistor 22. The emitter of transistor 22 is connected through a resistor 23 to a large negative ringing voltage supply 24. The voltage provided by source 24 is on the order of 200 volts to provide a ringing voltage of sufficient magnitude to operate a plurality of telephone ringers.

When the voltage at input terminal 11 goes negative, transistor 19 is enabled and a current flows through resistors 20 and 21 to enable transistor 22. When thus enabled, transistor 22 operates as a constant current sink to draw a constant discharging current from capacitor 18 through resistor 17 and diode 25 to negative voltage source 24.

It can be seen that during one half-cycle of the applied 20 Hz control voltage, transistor 14 deposits a charge at a linear rate on capacitor 18 until it reaches near ground potential, at which point transistor 14 saturates. During the other half-cycle of the applied voltage, transistor 22 removes charge from capacitor 18 at a linear rate until it reaches a point near the negative supply voltage 24, at which point transistor 22 saturates. The voltage on capacitor 18 therefore has a trapezoidal shape with substantially linear, symmetrical ramps on the rise and fall sides.

While charging capacitor 18, transistor 14 also draws a current through biasing resistor 26. The voltage across resistor 26 controls npn transistor 27 to permit a controlled voltage to appear on subscriber line 28 through lead 40, zener diode 39 and resistor 38. Similarly, transistor 22, when enabled, provides a voltage drop across biasing resistor 29 to control pnp transistor 30. Transistor 30 permits a linearly varying voltage to appear on subscriber line 28, through lead 40, resistor 38, and zener diode 39, until transistor 22 saturates.

A pair of low valued resistors 31 and 32 are connected in series between the respective emitters of transistors 27 and 30, with their midpoint connected to lead 40. Excessive current flow through either of these resistors creates a sufficient voltage drop thereacross to operate the corresponding one of transistors 33 or 34. When operated, transistors 33 and 34 shunt the base-emitter paths of transistors 27 and 30, respectively, to limit current flow through the corresponding one of the power transistors. It can be seen that separate current limiting is provided for the positive going and the negative going half-cycles of the ringing signal delivered to the subscriber loop. Such current limitation serves to protect transistors 27 and 30 and other components connected to the subscriber loop, as well as protect maintenance personnel who might be working on the loop.

A plurality of zener diodes 35 through 37 are connected between subscriber line 28 and ground potential. These zener diodes provide lightning protection by breaking down in the presence of high voltage signals and providing a low impedance path to ground for such signals. Resistor 38 limits the current flow in the zener diodes under such conditions.

A zener diode 39 is connected in series with the ringing supply line 40 and the subscriber loop 28. Zener diode 39 provides a voltage offset for the low voltage half of the ringing signal. This voltage offset equals the voltage level of the line feed circuit for loop 28 and thereby serves to prevent the ringing signal source from being loaded by the line feed circuit. Such a line feed circuit is shown, for example, in the copending application of B. S. Bosik, Ser. No. 974,386, filed Dec. 29, 1978. A diode 41 is connected from negative voltage source 24 to ringing supply line 40 to protect transistor 30 from reverse voltages. Such reverse voltages might otherwise damage transistor 30. Diodes 16 and 25 isolate capacitor 18 from foreign voltages on line 28, preventing unwanted turn-on of transistors 27 and 30. When both inputs 10 and 11 are removed, transistors 14, 19 and 22 are turned off, removing all drive from transistors 27 and 30. The ringing signal generator then draws no power supply current and appears as a high impedance ringing supply at line 40.

A ringing signal generator has been described which can be fabricated in a small, compact and economical circuit configuration. Moreover, this ringing signal generator minimizes crosstalk to other circuits by utilizing a trapezoidal ringing signal having relatively low amplitude high frequency components. The ringing supply includes automatic current limiting for both the positive going and the negative going half-cycles of the ringing signal. At the signal peaks, the ringing signal generator has an extremely low internal impedance and thus dissipates very little power internally. This permits a very large ratio of power-output-to-output-peak-voltage where the peak output voltage must be limited for safety reasons. In addition, it permits implementation of the generator using small, low power transisitors.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

We claim:

1. A ringing signal generator for operating telephone ringers

CHARACTERIZED BY a capacitor, means for alternately and linearly charging and discharging said capacitor, and means responsive to said capacitor charging means for supplying trapezoidal ringer signals to said telephone line.

2. The ringing signal generator according to claim 1 further

CHARACTERIZED IN THAT said charging and discharging means comprises at least two alternately enabled constant current sources.

3. The ringing signal generator according to claim 1 further

CHARACTERIZED BY a zener diode connected in series between said ringing signal generator and said telephone ringers.

4. The ringing signal generator according to claim 1 further

CHARACTERIZED BY current limiting means responsive to the current from said supplying means to disable said current supplying means when said current exceeds a preselected threshold.

5. A ringing generator for operating telephone ringers connected to a telephone line

CHARACTERIZED BY a source of direct current voltage, a first low impedance switching means for connecting said line to said source, a second low impedance switching means for connecting said line to ground potential, a capacitor coupled to alternately supply operating and disabling currents to each of said switching means, and constant current means for alternately charging and discharging said capacitor.

6. The ringing generator according to claim 5 further

CHARACTERIZED BY a zener diode connected between said switching means and said line.

7. The ringing generator according to claim 5 further

CHARACTERIZED BY separate current limiting means for each of said switching means.

8. The ringing generator according to claim 5 further

CHARACTERIZED BY unidirectional conducting means connected to isolate said capacitor from said line.

9. A remote ringing supply for telephone subscriber pair gain systems

CHARACTERIZED BY a trapezoidal wave generator, and voltage gating means responsive to said wave generator.

10. The remote ringing supply according to claim 9 further

CHARACTERIZED IN THAT said wave generator comprises a capacitor and two constant sources.

* * * * *